(12) United States Patent
Mominee et al.

(10) Patent No.: US 9,627,868 B2
(45) Date of Patent: Apr. 18, 2017

(54) BACKLESS ELECTRICAL BOX AND METHOD OF MAKING

(75) Inventors: Daniel S. Mominee, Chandler, AZ (US); Peter B. Korte, Bay Village, OH (US); Edward J. Lynch, Jr., Akron, OH (US); Raymond S. Laughlin, Middlefield, OH (US); Eric J. Wilson, Solon, OH (US); Raymond M. Olle, Broadview Heights, OH (US)

(73) Assignee: ERICO INTERNATIONAL CORPORATION, Solon, OH (US)

( * ) Notice: Subject to any disclaimer, the term of this patent is extended or adjusted under 35 U.S.C. 154(b) by 898 days.

(21) Appl. No.: 13/347,033

(22) Filed: Jan. 10, 2012

(65) Prior Publication Data

US 2013/0175263 A1  Jul. 11, 2013

(51) Int. Cl.
*H02G 3/08* (2006.01)
*B21D 51/52* (2006.01)

(52) U.S. Cl.
CPC ............ *H02G 3/081* (2013.01); *B21D 51/52* (2013.01)

(58) Field of Classification Search
CPC .......... H02G 3/18; H02G 3/081; H02G 3/121; H02G 3/123
USPC .................. 220/3.2–4.02; 174/58, 53, 61, 63
See application file for complete search history.

(56) References Cited

U.S. PATENT DOCUMENTS

| | | | |
|---|---|---|---|
| 740,663 A | 10/1903 | Krantz | |
| 876,187 A * | 1/1908 | Hornsby | 220/3.5 |
| 1,113,092 A * | 10/1914 | Beugler | 220/3.5 |
| 1,133,946 A * | 3/1915 | Farrell | 220/3.4 |
| 1,275,692 A * | 8/1918 | Hubbell | 220/3.7 |
| 1,275,725 A * | 8/1918 | Newton | 220/3.7 |
| 1,774,934 A * | 9/1930 | Mangin | 220/3.92 |
| 1,774,935 A * | 9/1930 | Mangin | 174/63 |
| 1,814,449 A * | 7/1931 | Morgenstern | 220/3.9 |
| 1,983,670 A * | 12/1934 | Knight | 248/228.3 |
| 2,032,636 A * | 3/1936 | Seckinger | 220/3.9 |
| 2,272,846 A * | 2/1942 | Lindstrom | 220/3.6 |
| 2,286,898 A * | 6/1942 | Cover | 220/3.6 |
| 2,374,622 A * | 4/1945 | Rugg | 174/58 |
| 2,378,861 A | 6/1945 | Peevey | |
| 2,422,847 A * | 6/1947 | Peter | 362/133 |
| 2,432,555 A * | 12/1947 | Smith | 248/27.1 |
| 2,605,923 A * | 8/1952 | Bergquist | 220/3.9 |
| 2,707,221 A | 4/1955 | Frank | |
| 2,917,199 A * | 12/1959 | Appleton | 220/3.7 |
| 2,989,206 A | 6/1961 | McAfee | |
| 3,115,265 A * | 12/1963 | Mulkey et al. | 220/3.5 |

(Continued)

*Primary Examiner* — King M Chu
(74) *Attorney, Agent, or Firm* — Quarles & Brady LLP

(57) ABSTRACT

A backless electrical box is formed out of a single piece of material, with a front and sides of the box being parts of the same single piece of material. The front of the box has an integrally-formed mud ring that extends forward from a front base of the front. The sides are made out of material bent back from two opposite edges of the front base, bent around to form the four sides. Some or all of the sides may have seams in them, which may be secured by portions of material overlapping along some or all of the height of the sides, riveted or otherwise attached together. Mounting flanges may extend from the other two opposite edges of the front base. Tabs bent downward from the mounting flanges may be used to cover holes in the sides that extend rearward from these two other opposite edges.

20 Claims, 10 Drawing Sheets

(56) References Cited

U.S. PATENT DOCUMENTS

| | | | |
|---|---|---|---|
| 3,148,698 A * | 9/1964 | Arnold | 137/360 |
| 3,365,156 A * | 1/1968 | Beck | 248/205.1 |
| 3,424,332 A | 1/1969 | Pimentel | |
| 3,424,333 A | 1/1969 | Pimentel | |
| 3,575,313 A | 4/1971 | Trachtenberg et al. | |
| 3,676,571 A | 7/1972 | Rubinstein | |
| 3,952,475 A | 4/1976 | Paskert | |
| 4,019,647 A | 4/1977 | Arnold | |
| 4,062,470 A * | 12/1977 | Boteler | 220/3.3 |
| 4,165,443 A | 8/1979 | Figart et al. | |
| 4,612,412 A | 9/1986 | Johnston | |
| 4,634,015 A | 1/1987 | Taylor | |
| 4,842,551 A | 6/1989 | Heimann | |
| 5,012,043 A | 4/1991 | Seymour | |
| 5,025,944 A | 6/1991 | Rodick | |
| 5,042,673 A | 8/1991 | McShane | |
| 5,289,934 A * | 3/1994 | Smith et al. | 220/3.7 |
| 5,293,003 A | 3/1994 | Prairie, Jr. | |
| 5,378,854 A * | 1/1995 | Hoover | 174/53 |
| 5,452,873 A * | 9/1995 | Laughlin | 248/205.1 |
| RE35,075 E | 10/1995 | Lammens, Jr. | |
| 5,595,362 A | 1/1997 | Rinderer et al. | |
| 5,596,174 A * | 1/1997 | Sapienza | 174/57 |
| 5,603,424 A * | 2/1997 | Bordwell et al. | 220/3.5 |
| 5,646,371 A * | 7/1997 | Fabian | 174/58 |
| 5,736,674 A | 4/1998 | Gretz | |
| 5,833,110 A | 11/1998 | Chandler et al. | |
| 5,921,737 A | 7/1999 | Ibey | |
| 5,931,325 A | 8/1999 | Filipov | |
| 5,959,246 A | 9/1999 | Gretz | |
| 6,147,304 A | 11/2000 | Doherty | |
| 6,204,447 B1 | 3/2001 | Gretz | |
| 6,218,615 B1 * | 4/2001 | Canonico | 174/50 |
| 6,307,154 B1 | 10/2001 | Gretz | |
| 6,369,322 B1 * | 4/2002 | Gretz | H02G 3/121 174/50 |
| 6,533,225 B1 | 3/2003 | Berges et al. | |
| 6,573,449 B2 | 6/2003 | Vrame | |
| 6,576,837 B1 | 6/2003 | Pimentel | |
| 6,737,576 B1 | 5/2004 | Dinh | |
| 6,749,162 B2 * | 6/2004 | Nicolides et al. | 248/231.9 |
| 6,765,146 B1 * | 7/2004 | Gerardo | 174/58 |
| 6,820,760 B2 * | 11/2004 | Wegner | H02G 3/086 174/57 |
| 6,870,101 B1 | 3/2005 | Hull et al. | |
| 6,875,922 B1 | 4/2005 | Petak et al. | |
| 6,903,272 B2 * | 6/2005 | Dinh | 174/58 |
| 6,956,172 B2 | 10/2005 | Dinh | |
| 7,038,131 B1 | 5/2006 | Gretz | |
| 7,082,728 B1 * | 8/2006 | McConaughy et al. | 52/220.1 |
| 7,087,837 B1 | 8/2006 | Gretz | |
| 7,141,736 B2 * | 11/2006 | Plankell | 174/50 |
| 7,151,218 B2 | 12/2006 | Dinh | |
| 7,173,184 B2 | 2/2007 | Hull et al. | |
| 7,189,928 B2 * | 3/2007 | Denier | H02G 3/123 174/480 |
| 7,214,876 B1 | 5/2007 | Haberek et al. | |
| 7,259,328 B1 | 8/2007 | Gretz | |
| 7,271,335 B2 * | 9/2007 | Dinh | 174/58 |
| 7,273,982 B1 * | 9/2007 | Lalancette | H02G 3/081 174/50 |
| 7,276,661 B2 | 10/2007 | Wegner et al. | |
| 7,300,025 B2 | 11/2007 | Korcz | |
| 7,301,099 B1 | 11/2007 | Korcz | |
| 7,306,482 B1 | 12/2007 | Kidman | |
| 7,312,396 B1 | 12/2007 | Gorman | |
| 7,410,072 B2 | 8/2008 | Wegner et al. | |
| 7,439,443 B2 | 10/2008 | Dinh | |
| 7,468,486 B2 | 12/2008 | Yan | |
| 7,495,170 B2 | 2/2009 | Dinh et al. | |
| 7,531,743 B2 | 5/2009 | Johnson et al. | |
| 7,572,977 B2 | 8/2009 | Gorman | |
| 7,628,286 B2 * | 12/2009 | Lalancette | 220/3.7 |
| 7,637,385 B2 | 12/2009 | Wegner et al. | |
| 7,645,936 B2 | 1/2010 | Magno, Jr. | |
| 7,718,893 B2 | 5/2010 | Purves et al. | |
| 7,757,875 B2 * | 7/2010 | Lalancette | H02G 3/086 220/3.7 |
| 7,762,415 B2 * | 7/2010 | Matsui | 220/4.02 |
| RE41,661 E | 9/2010 | Dinh | |
| 7,798,458 B2 * | 9/2010 | Borbolla | H02G 3/086 248/300 |
| 7,935,886 B2 | 5/2011 | Jafari | |
| 8,168,887 B2 | 5/2012 | Phillips | |
| 8,251,253 B1 | 8/2012 | Cleghorn et al. | 220/844 |
| 8,598,454 B2 * | 12/2013 | Laughlin | 174/58 |
| 2004/0045960 A1 * | 3/2004 | Rose | 220/3.9 |
| 2006/0076348 A1 * | 4/2006 | Michaud | 220/3.94 |
| 2006/0108362 A1 * | 5/2006 | Lalancette | 220/3.7 |
| 2008/0020632 A1 | 1/2008 | Gorman | |
| 2008/0047729 A1 | 2/2008 | Wegner et al. | |
| 2008/0053698 A1 | 3/2008 | Purves et al. | |
| 2008/0093099 A1 * | 4/2008 | Webb | H02G 3/14 174/53 |
| 2008/0156514 A1 * | 7/2008 | Webb | H02G 3/12 174/58 |
| 2010/0084184 A1 | 4/2010 | Phillips | |
| 2013/0153256 A1 * | 6/2013 | Laughlin | H02G 3/081 174/50 |

\* cited by examiner

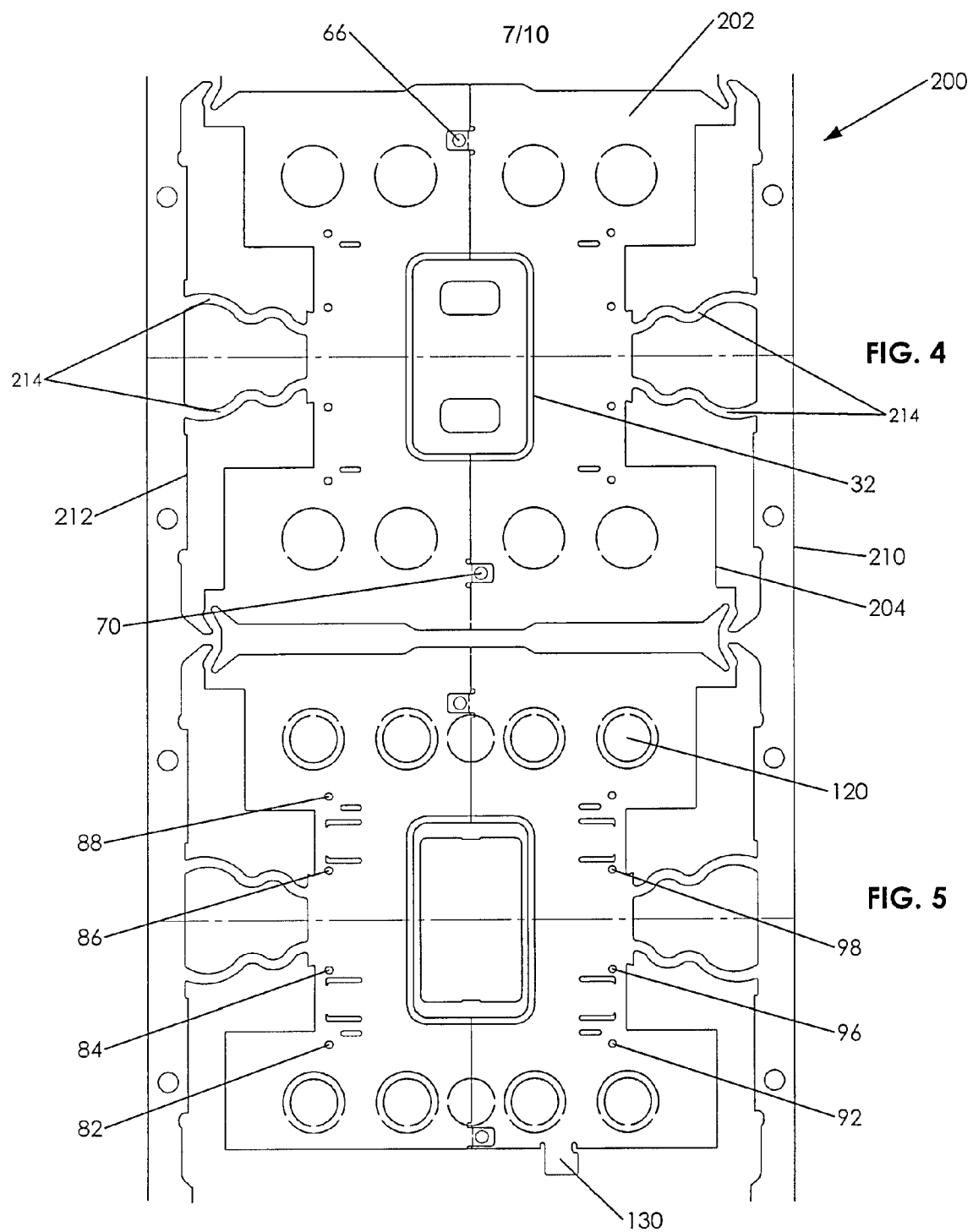

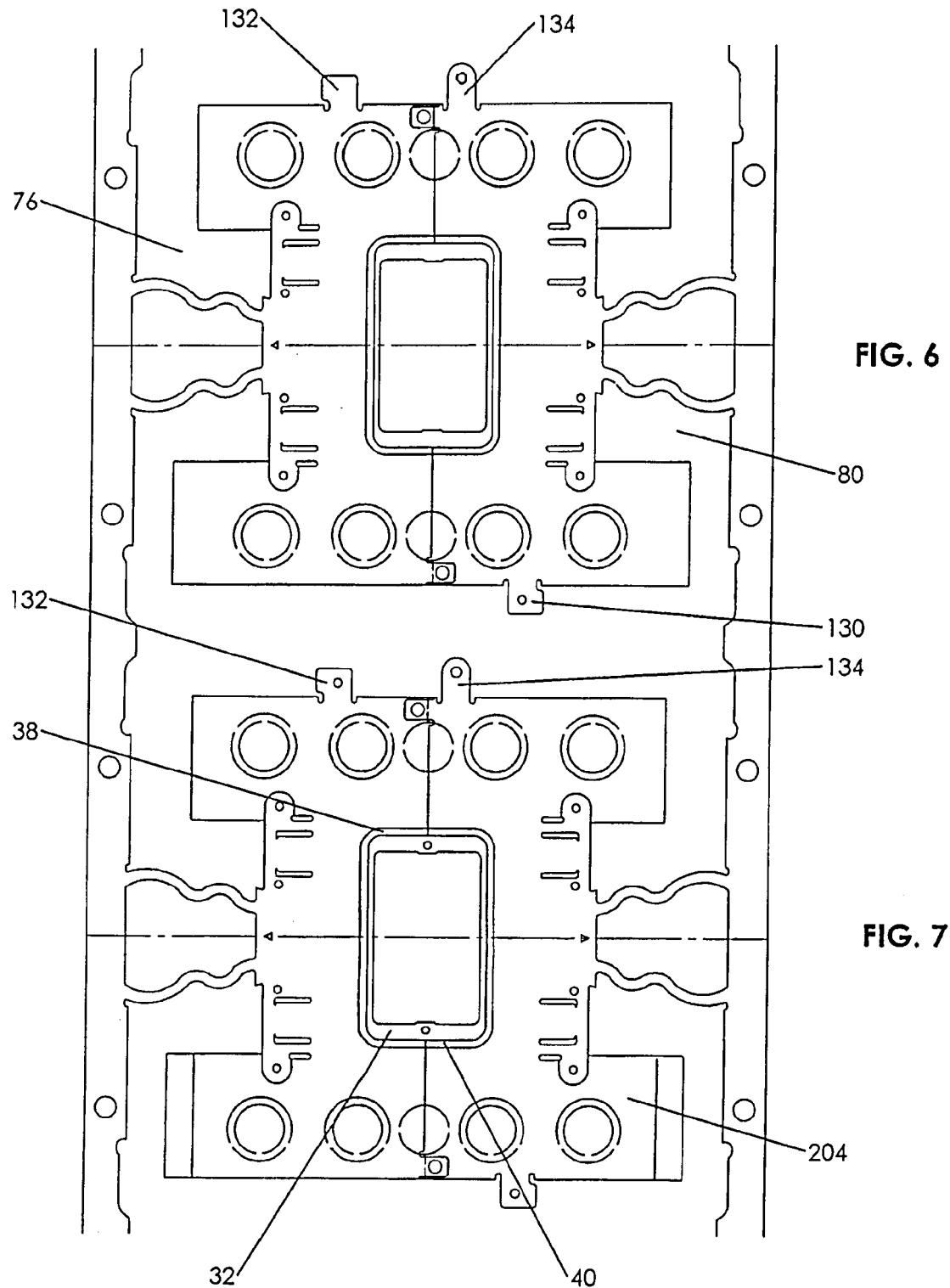

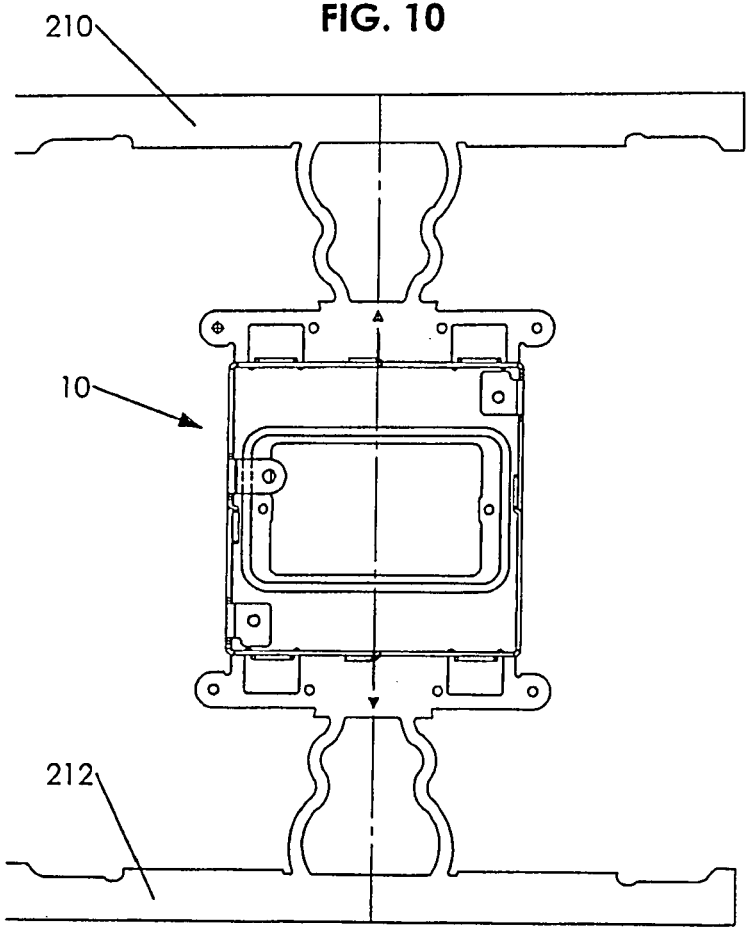
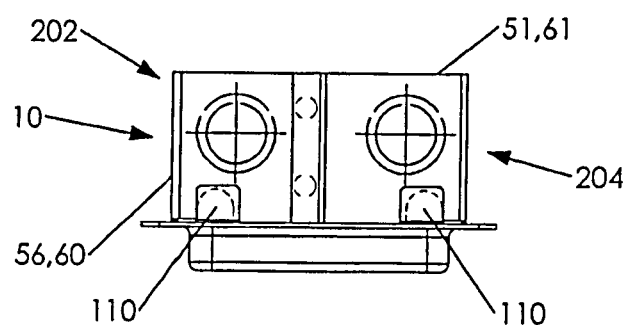

BACKLESS ELECTRICAL BOX AND METHOD OF MAKING

BACKGROUND OF THE INVENTION

Field of the Invention

The invention is in the field of electrical boxes, and methods for making electrical boxes.

Description of the Related Art

Electrical boxes are widely used to mount electrical components, such as switches and outlets, and to contain electrical wiring connections. Mud rings or plaster rings are often used at the fronts of electrical boxes to bring the front openings of the boxes flush with, or close to flush with, the outside surface of the wall material. Installation of mud rings and various installation components, such as brackets for attaching electrical boxes to wall studs, can be a time consuming process.

SUMMARY OF THE INVENTION

According to an aspect of an invention, a backless electrical box includes an integral mud ring, and is made out of a single continuous piece of metal.

According to a further aspect of the invention, an electrical box includes a front, and sides, all being parts of a single continuous piece of metal, such as a piece of sheet steel.

According to a still further aspect of the invention, an electrical box has seams in one or more of its sides.

According to another aspect of the invention, an electrical box has openings in sides that are covered by flaps or tabs bent down from the front of the box.

According to yet another aspect of the invention, a backless electrical box is made from a single piece of material, in a strip process. The process involves such steps as forming an integral mud ring, cutting various parts of the electrical box, forming and threading holes, folding to produce the front and sides of the box, and sealing seams in the sides of the box.

According to still another aspect of the invention, an electrical box is made from a single piece of material, such as sheet steel having a thickness of at least 0.05 inches, with integral mounting brackets that allow the electrical box to be mounted to a stud or other structure without the use of a separate mounting bracket.

According to a further aspect of the invention, an electrical box includes: a front; and four sides extending rearward from the front to define a rectangular enclosure (for example, a square or nearly square enclosure) for making electrical connections in. The front and the sides are parts of a single piece of monolithic continuous material. At least some of the sides have respective seams in them.

According to a still further aspect of the invention, a method of forming an electrical box includes: providing a sheet metal blank; and folding side pieces of the blank down from first and third edges of a front base, wherein the front base is a substantially rectangular (e.g., square or nearly square) front base having a first edge, a second edge, a third edge, and a fourth edge, with the first edge and the third edge being substantially parallel to each other and on opposite sides of the front base, and the second edge and the fourth edge being substantially parallel to each other and on opposite sides of the front base, the folding thereby forming a first side extending rearward from the first edge, a second side extending rearward from the second edge, a third side extending rearward from the third edge, and a fourth side extending rearward from the fourth edge, wherein the sides form a rectangular enclosure behind the front base.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

The annexed drawings, which are not necessarily to scale, show various aspects of the invention.

FIG. 4 is a plan view of an early step in a process of making the electrical box of FIGS. 1 and 2.

FIG. 5 is a plan view of a subsequent step in a process of making the electrical box of FIGS. 1 and 2.

FIG. 6 is a plan view of a subsequent step in a process of making the electrical box of FIGS. 1 and 2.

FIG. 7 is a plan view of a subsequent step in a process of making the electrical box of FIGS. 1 and 2.

FIG. 10 is a plan view of a subsequent step in a process of making the electrical box of FIGS. 1 and 2.

FIG. 11 is a side view of the step illustrated in FIG. 10.

DETAILED DESCRIPTION

A backless electrical box is formed out of a single piece of material, with a front and sides of the box being parts of the same single piece of material. The front of the box has an integrally-formed mud ring that extends forward from a front base of the front. The sides are made out of material bent back from two opposite edges of the front base, bent around to form the four sides. Some or all of the sides may have seams in them, which may be secured by portions of material overlapping along some or all of the height of the sides, riveted or otherwise attached together. Mounting flanges may extend from the other two opposite edges of the front base. Tabs bent downward from the mounting flanges may be used to cover holes in the sides that extend rearward from these two other opposite edges. The material of the electrical box may be a suitable steel about 0.05 inches thick. The formation of such a box out of a single piece of material increases structural integrity, and may allow use of the electrical box without an additional mounting bracket, among other advantages.

Figure 1:
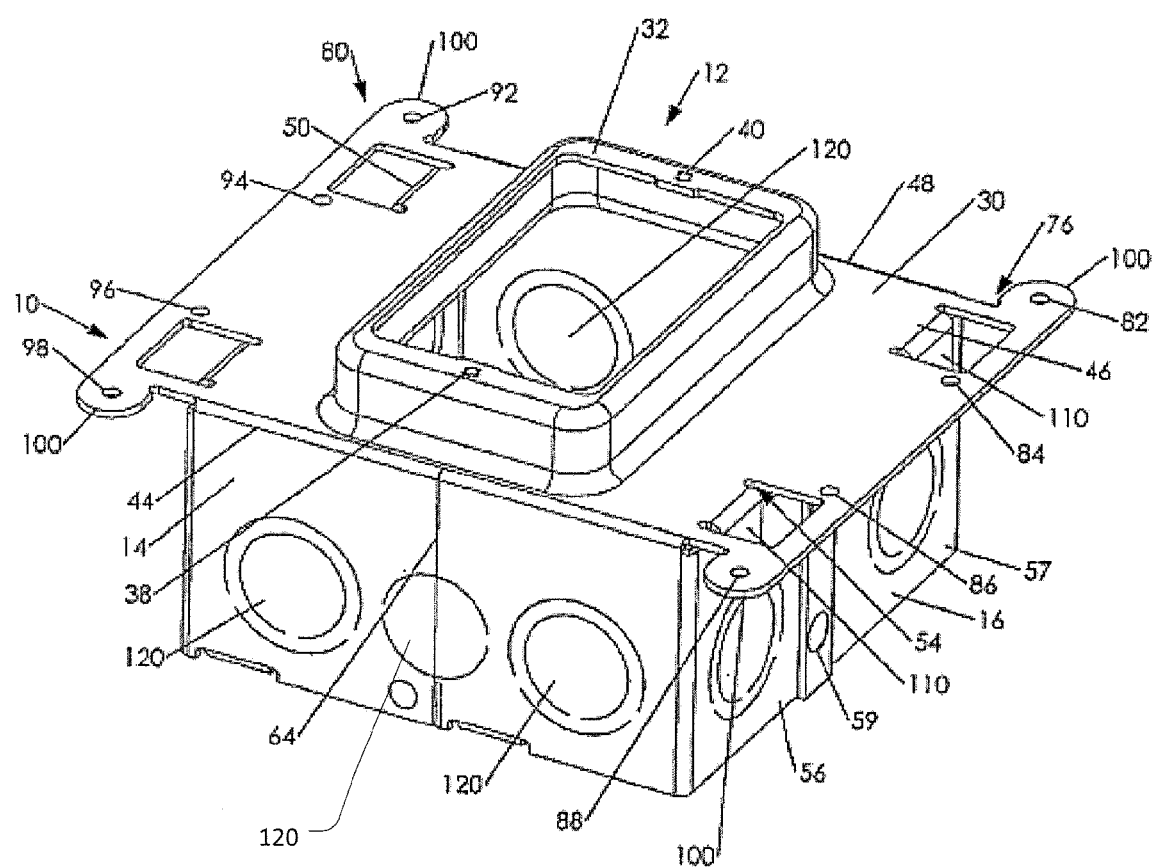
FIG. 1 is an oblique view of an open-back electrical box in accordance with an embodiment of the invention.
Figure 2:
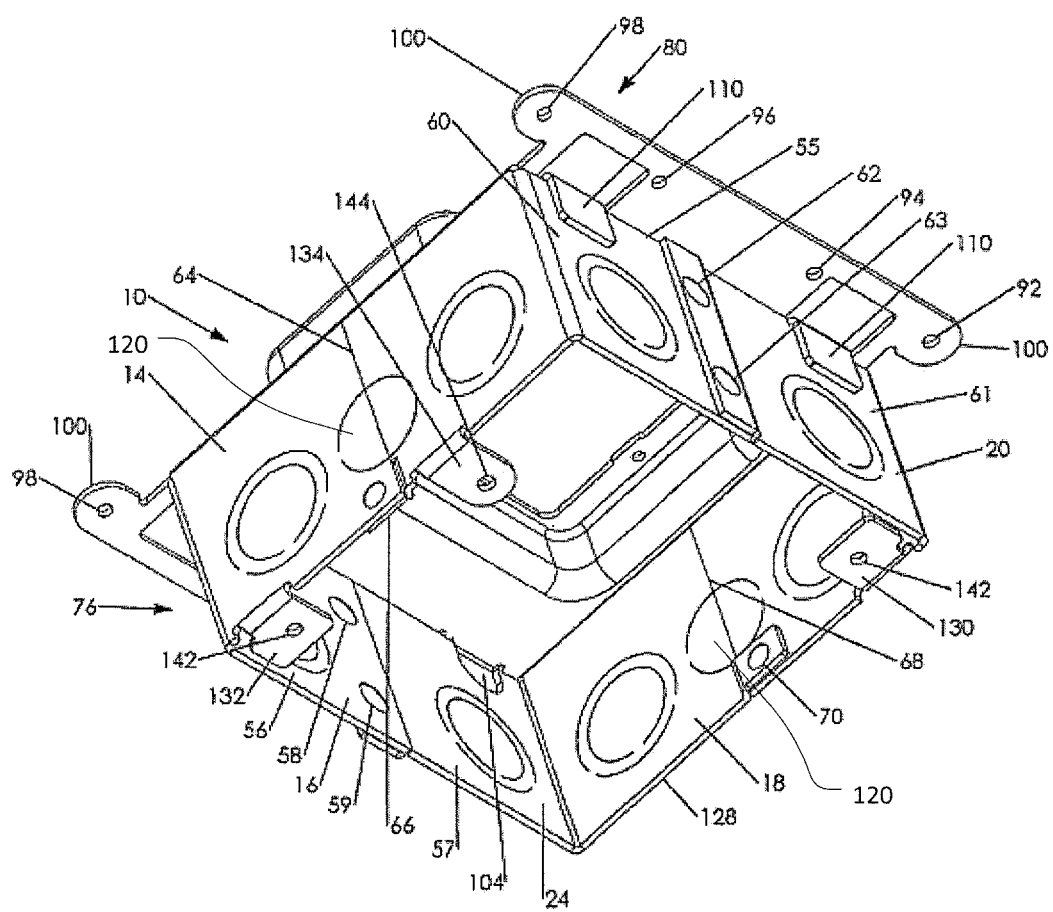
FIG. 2 is another oblique view of the electrical box of FIG. 1, showing the bottom of the electrical box.

Referring initially to FIGS. 1 and 2, an electrical box 10 is made out of a single piece of continuous sheet material, such as a suitable steel sheet. The box 10 includes a front 12, and four sides 14, 16, 18, and 20 that extend rearward from the box 10. The front 12 and the sides 14-20 define a volume 24 within the box, where electrical connections are made with an electrical device (not shown), such as an electrical outlet or a switch. The front 10 includes a front base 30, an integral mud ring 32 that extends forward from the front base 30. The mud ring 32 has threaded holes 38 and 40 for securing an electrical device, such as an outlet or switch. The rectangular front base 30 may be a square or nearly square base that has a first edge 44, a second edge 46, a third edge 48, and fourth edge 50. The first side 14 extends back from the first edge 44, the second side 16 extends back from the second edge 46, the third side 18 extends back from the third edge 48, and the fourth side 20 extends back from the fourth edge 50.

The first side 14 is folded over from the first edge 44. The third side 18 is similarly folded over from the third edge 48. In contrast, the second side 16 and the fourth side 20 are not folded over from the edges 46 and 50 that they abut. Instead the second side 16 and the fourth side 20 are made up of parts folded over from the ends of the first side 14 and the third side 18, with respective top seams 54 and 55 between the sides 14 and 18, and the edges 44 and 48 that the sides 14 and 18 abut. The second side 16 is made up of parts 56 and 57 that are folded over from the first side 14 and the third side 18, respectively. The parts 56 and 57 overlap and are secured together at two locations 58 and 59 at the top and the bottom of the overlap. The securing may be accomplished by using a punch to deform and join together material in the overlapped layers. Alternatively rivets, spot welds, or other fasteners or means of fastening may be used to secure the overlap. The fourth side 20 is similarly made of overlapped parts 60 and 61, folded over from the first side 14 and the third side 18 respectively, and secured together at locations 62 and 63.

The first side 14 and the third side 18 have respective seams 64 and 68. The seams 64 and 68 are present because of the need to allow material to move when the mud ring 32 is formed on the front base 30. The seams 64 and 68 extend up the full height of the sides 14 and 18, and may extend onto the front base 30 and even the proximal part of the mud ring 32 (the part of the mud ring 32 that is closest to and joins with the front base 30). Tabs 66 and 70 are used in securing the seams 64 and 68 closed. The tabs 66 and 70 may be secured in the same way as the overlapped parts of the second side 16 and the fourth side 20, by deformation of material or by use of fasteners or welds.

Mounting flanges 76 and 80 extend outward from the second edge 46 and the fourth edge 50, respectively. The mounting flanges 76 and 80 are used for mounting the box 10 to building structure, such as to a metal or wood stud. The mounting flange 76 has a series of four holes 82, 84, 86, and 88, any or all of which may receive fasteners such as screws or nails, for attaching the box 10 to building structure. The mounting flange 80 has a corresponding series of mounting holes 92, 94, 96, and 98. The distal holes 82/88 and 92/98 are in distal flange tabs 100 that extend beyond the first edge 44 and the third edge 48, further from a center of the box front 12 than the edges 44 and 48. As will be described further below, the flange tabs 100 correspond to openings 104 in the second side 16 and the fourth side 20. Covering tabs 110 are bent down from the mounting flanges 76 and 80 to cover the openings 104. The covering tabs 110 are bent down from the mounting flanges 76 and 80 along the second edge 16 and the fourth edge 20.

The sides 14-20 have various circular knockouts 120 of one or more sizes. The knockouts 120 contain weakened portions that facilitate removal of portions of the sides 14-20. The knockouts 120 may be weakened by partially severing or punching out the material of the knockout 120. The knockouts 120 can be selectively removed as needed to allow ingress and egress of various electrical lines, for connection to an electrical device secured to the mud ring 32, for example. Some of the knockouts 120 overlap seams in the sides 14 and 18.

Figure 3A:
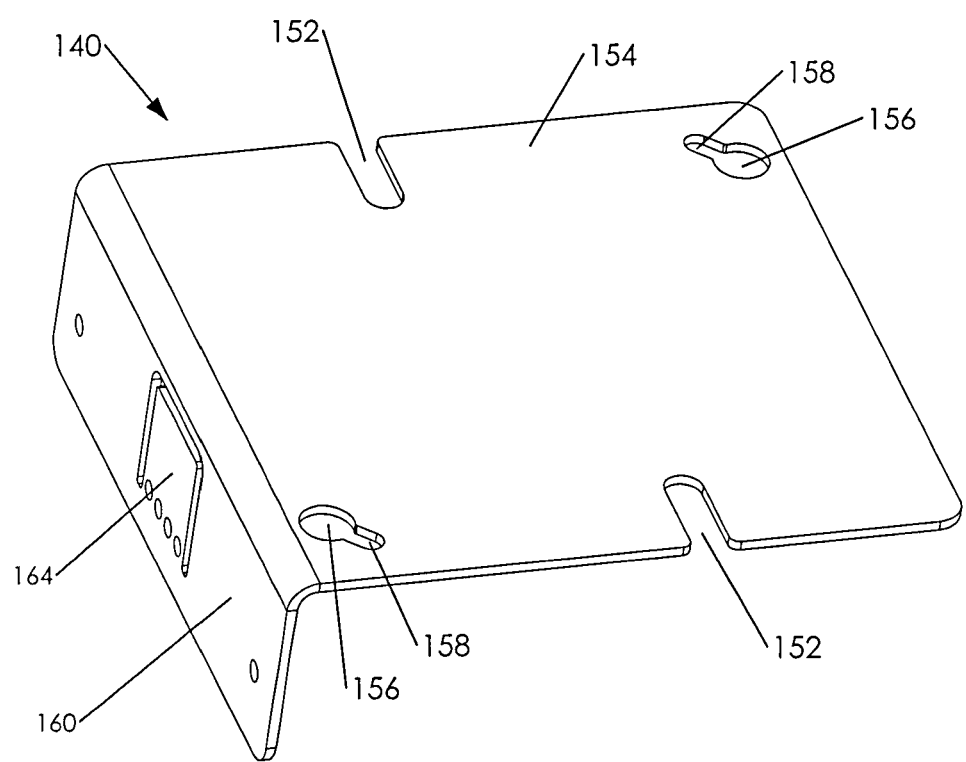
FIG. 3A is an oblique view of a back plate cover for covering the back of the electrical box of FIGS. 1 and 2.

Referring in particular to FIG. 2, a bottom edge 128 of the box 10 has three tabs 130, 132, and 134, bent over and extending into the interior volume 24 defined by the sides 14-20. The tabs 130 and 132 are used for receiving a back plate with far-side support 140 (FIG. 3A). Screws or other threaded fasteners 142 may be used to secure the back plate 140 against the tabs 130 and 132. This closes off the back of the box 10, and provides isolation for the electrical connections made in the volume 24.

The tab 134 is used for electrically grounding the box 10. A grounding screw 144 secures a grounding wire (not shown) to the tab 134, allowing the box 10 to be grounded using the electrical lines that are inserted into the interior volume 24 of the box 10 through the knockouts 120.

The fasteners 142 may be pre-installed in the box 10. As shown in FIG. 3A, the back plate 140 has a pair of slots 150 and 152. The slot 150 is for receiving the shaft of the fastener 142 engaging the tab 130, and the slot 152 is for receiving the shaft end of the grounding screw 144. A hole 154 receives the shaft of the other fastener 142, the one engaged in the tab 132. The hole 154 has two parts, a wide portion 156 large enough to allow the head of the fastener 142 to pass through, and a narrow portion 158 that allows the shaft of the fastener 142, but the not the head, to enter. The back plate 140 is installed by first engaging the slots 150 and 152, then by passing the head of the other fastener 142 through the hole wide portion 156, and rotating the back plate 140 to engage the hole narrow portion 158. Finally the fasteners are tightened to secure the back plate 140 against the tabs 130 and 132, closing off the back of the box 10 (FIG. 1).

Figure 3B:
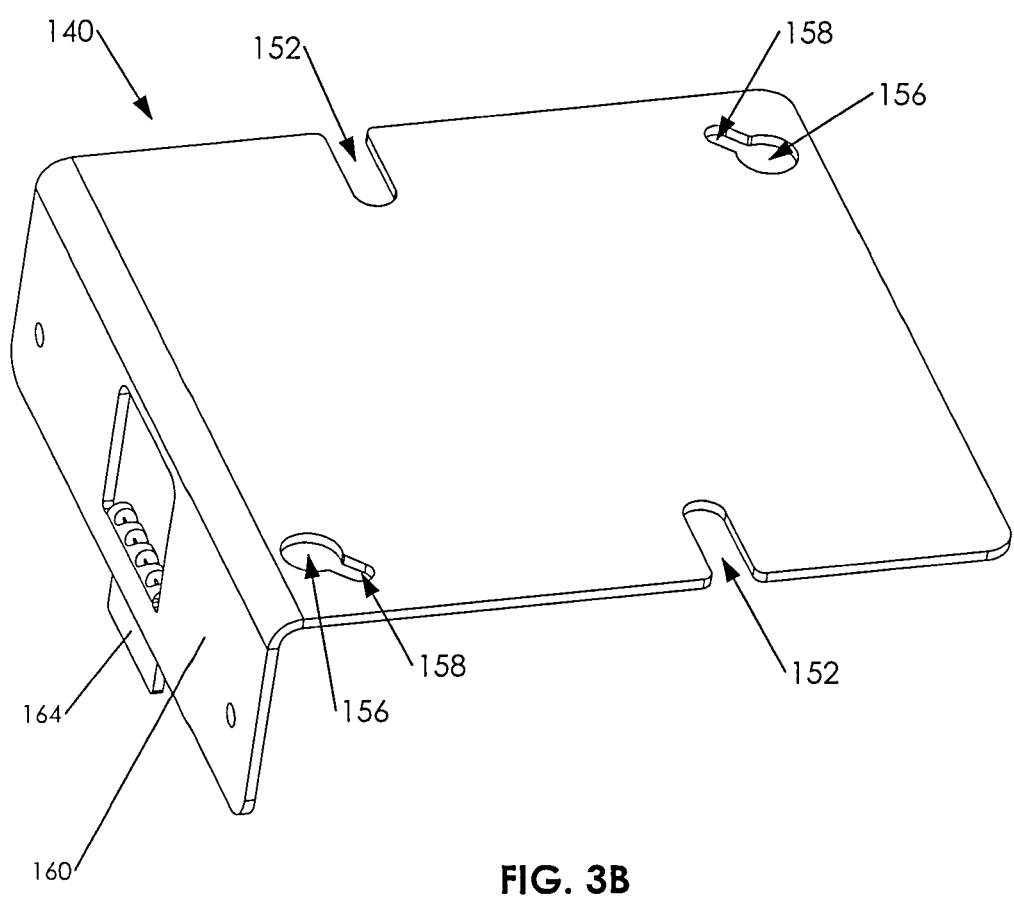
FIG. 3B is another oblique view of the back plate cover of FIG. 3A, with an extender of a support flange of the back plate folded over.

The back plate 140 also has a farside support flange 160 for use as a spacer to aid in supporting the box 10 between drywall sheets or other structure, as described further below. The support flange 160 includes an extender tab 164, which may be folded over to extend the length of the support flange 160, as illustrated in FIG. 3B. The extender tab 164 is used when there is a greater distance between drywall sheets or other structures which support the box 10 (FIG. 1).

Figure 3C:
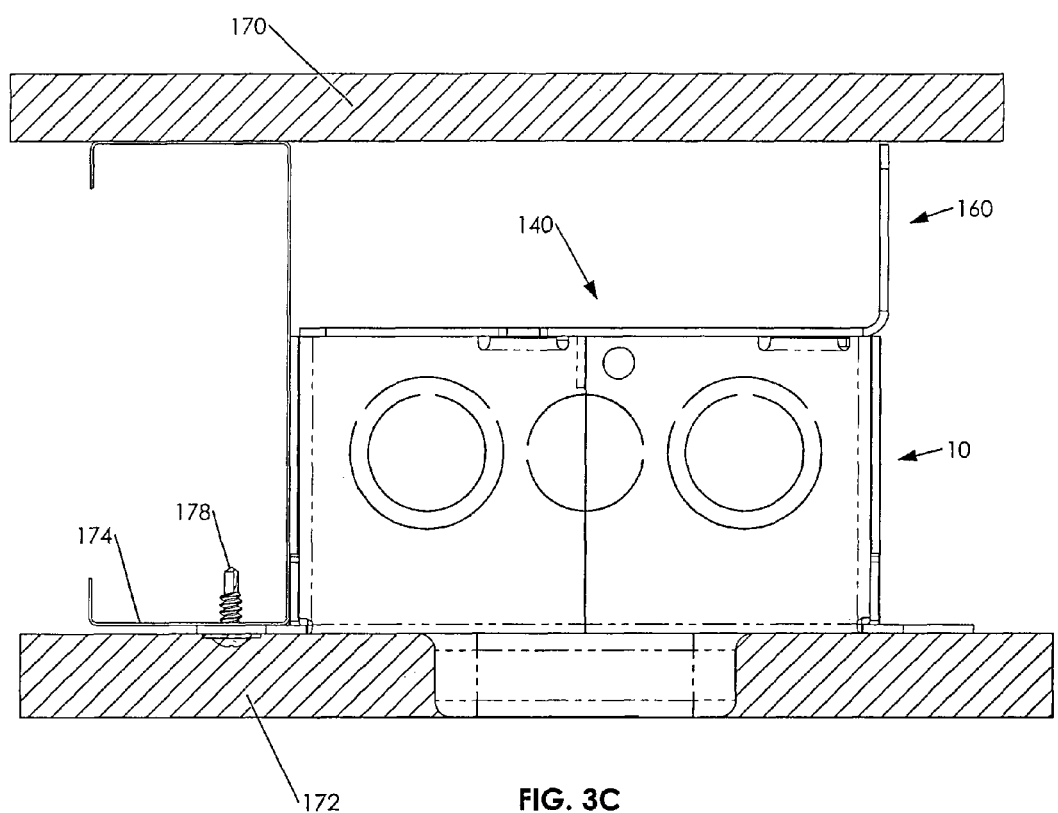
FIG. 3C is a side partially cutaway view of the box supported by a pair of drywall sheets having a relatively small spacing.

FIG. 3C shows the box 10 supported by two drywall sheets 170 and 172. The box 10 is attached to a metal stud 174 by a stud screw 178. The stud 174 is positioned between the drywall sheets 170 and 172, which have a relatively small spacing between them, such as a spacing of 3.625 inches (9.2 cm). The edge of the support flange 160 of the back plate 140 presses against the far drywall sheet 170, providing structural support for the box 10.

Figure 3D:
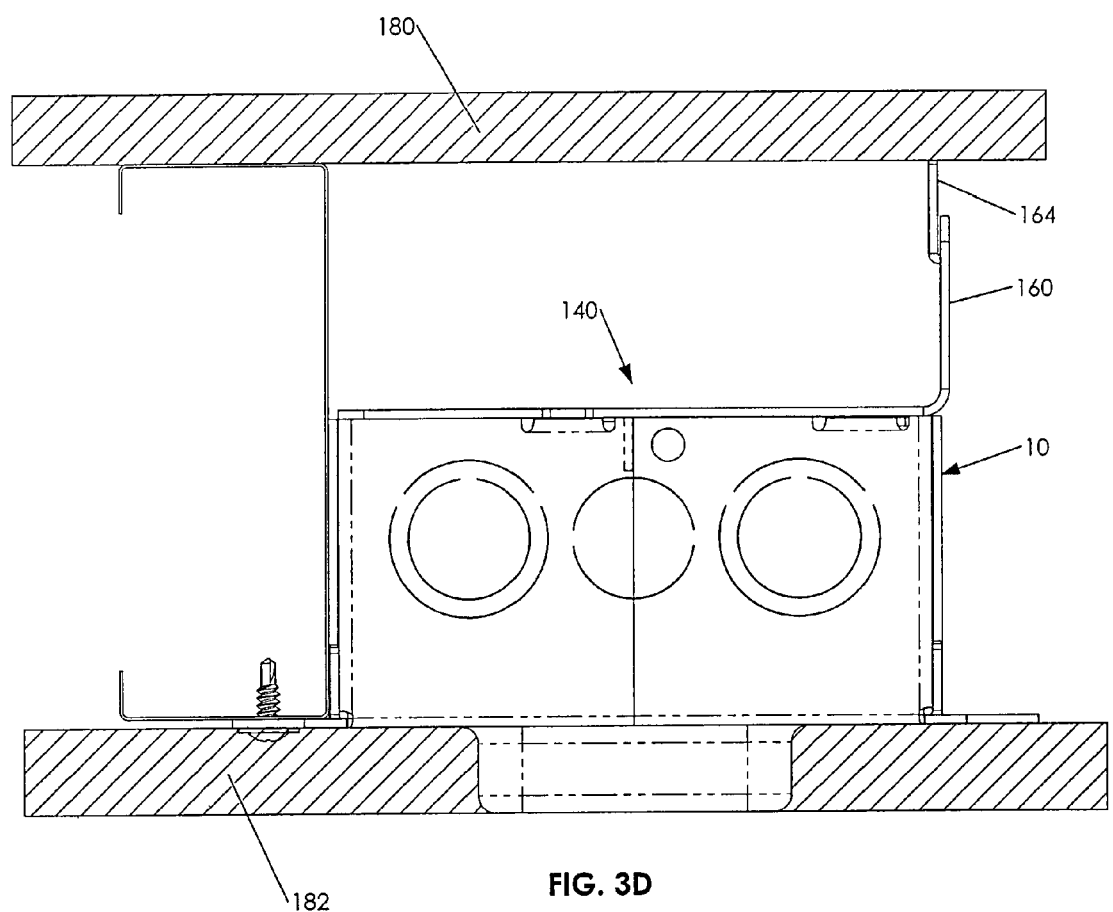
FIG. 3D is a side partially cutaway view of the box supported by a pair of drywall sheets having a relatively large spacing.

FIG. 3D shows the box 10 supported by two drywall sheets 180 and 182 that are separated by a metal stud 184 at a relatively large spacing, for example a spacing of 4 inches (10.2 cm). In order for the box 10 and the back plate support flange 160, the extender tab 164 of the support flange 160 must be folded over. This allows the edge of the tab 164 to press against the far drywall sheet 180, providing structural support for the box 10.

FIGS. 4-11 show steps in a process of making the box 10. The steps are parts of a strip process, wherein the box 10 remains attached to a strip 200 throughout the process. An initial step is shown in FIG. 4, with the mud ring 32 already formed, with some cutting being done to partially form side pieces 202 and 204 that will be used to produce the sides 14-20 (FIG. 1), and with the some of the mounting flange holes and knockouts formed. The tabs 66 and 70 have been secured to prevent the seams 64 and 68 from opening up. The box 10 is attached to top and bottom elements 210 and 212 by thin filaments of material 214 extending from the elements 210 and 212 to the top and bottom of the front base 32. The elements 210 and 212 include holes for positioning the box 10 properly for operations performed on the strip of material.

FIG. 5 shows the box 10 after further formation of the knockouts 120. In the same step the formation of the mounting flange holes 82-98 is completed, a cut for the tab 130 is made, and some of the cuts for forming the covering tabs 110 are made.

FIG. 6 shows the next step in the process, with the hole in the tab 130 formed, and with cuts made to define the tabs 132 and 134, and to further define the mounting flanges 76 and 80. In FIG. 7 the process for forming holes is completed, with threaded holes being formed in the tabs 132 and 134, and with the threaded holes 38 and 40 being formed in the mud ring 32. The ends of the side piece 204 are also deformed, offset slightly to allow the subsequent overlapping between the parts of the second side 16 and the fourth side 20 (FIGS. 1 and 2). Finally the holes for the tabs 130, 132, and 134 are tapped.

Figure 8:
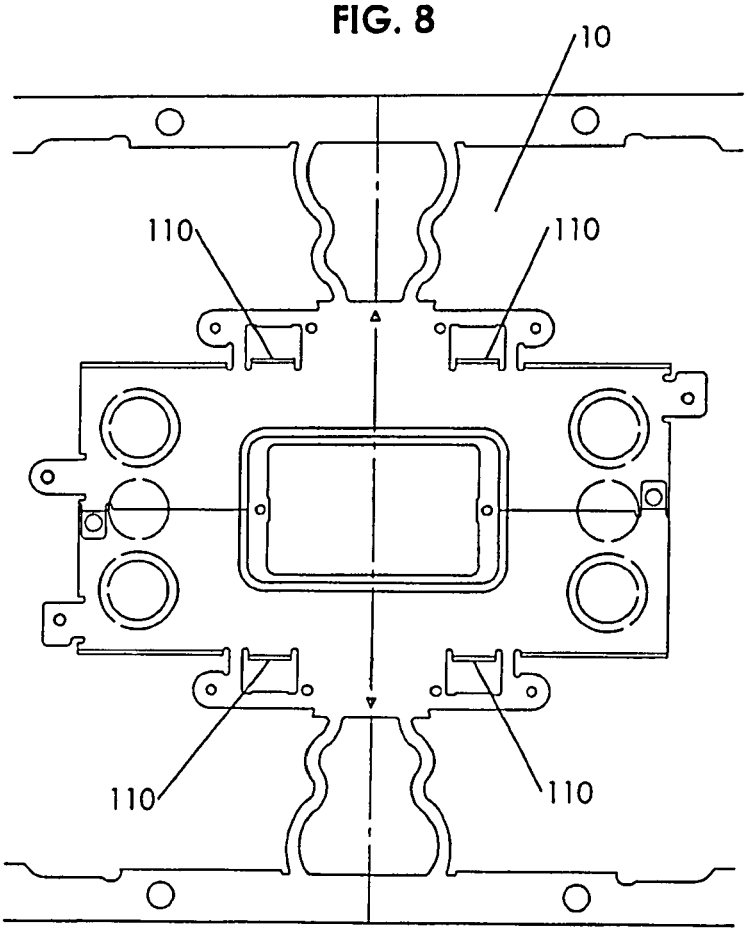
FIG. 8 is a plan view of a subsequent step in a process of making the electrical box of FIGS. 1 and 2.
Figure 9:
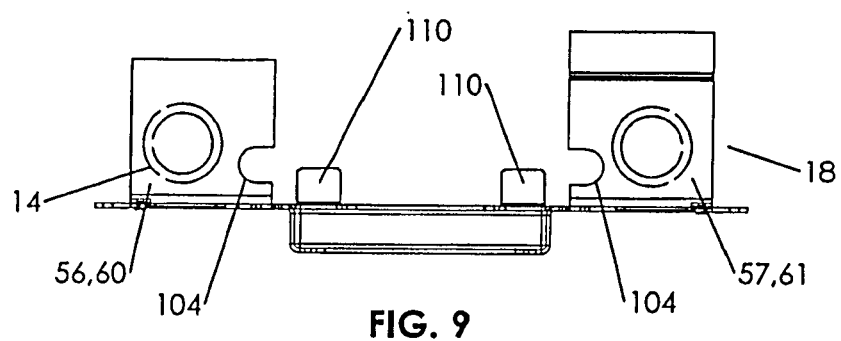
FIG. 9 is a side view of the step illustrated in FIG. 8.

In the process illustrated in FIGS. 8 and 9, the parts 56, 57, 60, and 61 are bent downward from the first side 14 and the third side 18. The covering tabs 110 are also bent downward in the same process. FIG. 9 shows some of the openings 104 in the parts 56, 57, 60, and 61 that are subsequently covered by the covering tabs 110.

The tabs 130-134 are then bent into place, and the side pieces 202 and 204 are bent downward as shown in FIGS. 10 and 11, to form the sides 14-20 (FIGS. 1 and 2) of the box 10. Then the covering tabs 110 are bent further to secure them against the parts 56, 57, 60, and 61. With the parts 56, 57, 60, and 61 of the second and fourth sides 16 and 20 held in place by the covering tabs 110, the overlapped parts of the second and fourth sides 16 and 20 are then secured by deforming material of the overlapped portions, as described above. Finally the finished box 10 is separated from the elements 210 and 212, completing the strip process.

The box 10 has many advantages over prior electrical boxes. The box 10 is made from a continuous, monolithic piece of sheet metal, such as sheet steel. The metal may be at least 0.05 inches thick, for example being 0.05 inches thick. The formation of the box 10 out of a single piece of material requires special processing to secure seams and close up openings, as described above. The formation of the box 10 from a single piece of relatively thick and rigid material gives the finished box 10 a strength that is not equaled by multi-part boxes made of thinner and more flexible material. The box 10 has sufficient rigidity to be used by directly attaching it to structure such as a stud, without use of any additional bracket or other piece. This allows an installation to be made more quickly, and with fewer parts. In addition, the box 10 can have an electrical device, such an outlet or switch, preinstalled and partially wired. This facilitates on-site installation and making of electrical connections.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. An electrical box comprising:
    a front; and
    four sides extending rearward from the front to define a substantially rectangular enclosure for electrical connections, with a respective intersection between each adjacent pair of the four sides;
    the front and the four sides being parts of a single piece of continuous material;
    each of at least two of the four sides having a distinct respective seam that is spaced apart from the respective intersections and extends over a full height of the respective side; and
    the front covering a portion of a front opening of the substantially rectangular enclosure, the portion extending between two opposite sides of the four sides.

2. The electrical box of claim 1,
    wherein one or more of the four sides include knockouts; and
    wherein at least one of the knockouts overlaps at least one of the seams.

3. An electrical box comprising:
    a front; and
    four sides extending rearward from the front to define a substantially rectangular enclosure for electrical connections;
    the front and the four sides being parts of a single piece of continuous material;
    at least one of the four sides having a distinct respective seam; and
    the front including:
        a front base, with the four sides extending rearward from the front base; and
        an integral mud ring that extends forward from the front base, the integral mud ring being part of the single piece of continuous material.

4. The electrical box of claim 3,
    wherein the front base is substantially rectangular with a first edge, a second edge, a third edge, and a fourth edge, the first edge and the third edge being substantially parallel to each other and on opposite sides of the front base from each other, and the second edge and the fourth edge being substantially parallel to each other and on opposite sides of the front base from each other; wherein the four sides include:
a first side extending rearward from the first edge;
a second side extending rearward from the second edge;
a third side extending rearward from the third edge; and
a fourth side extending rearward from the fourth edge;
wherein the four sides are made up of material folded rearward from the first and third edges; and
wherein the front includes a first mounting flange extending from the second edge, and a second mounting flange extending from the fourth edge.

5. The electrical box of claim 4, further comprising a first covering tab folded backward from the second edge and a second covering tab folded backward from the fourth edge, the first covering tab covering a first opening in the second side and the second covering tab covering a second opening in the fourth side.

6. The electrical box of claim 5,
wherein the first mounting flange includes a first distal portion and the second mounting flange includes a second distal portion, the first distal portion corresponding in shape to the first opening covered and the second distal portion corresponding in shape to the second opening.

7. The electrical box of claim 4,
wherein the second side abuts the second edge, with a top seam between the second side and the second edge; and
wherein the fourth side abuts the fourth edge, with another top seam between the fourth side and the fourth edge.

8. The electrical box of claim 1, wherein the front includes a first mounting flange and a second mounting flange on opposite sides of the front from each other.

9. The electrical box of claim 8, wherein the first mounting flange includes a first cutout and the second mounting flange includes a second cutout, the first cutout being bent rearward to cover a first opening in one of the four sides and the second cutout being bent rearward to cover a second opening in another of the four sides.

10. The electrical box of claim 1, wherein each of at least two of the seams is covered by a respective overlap of material of a respective one of the four sides.

11. The electrical box of claim 10, wherein the overlaps extends along the height of the four sides.

12. The electrical box of claim 10, wherein at least one of the overlaps includes a tab.

13. The electrical box of claim 10, wherein each of the overlaps is mechanically joined to secure the respective seam covered by the respective overlap.

14. The electrical box of claim 1, wherein each of the four sides has a distinct respective seam.

15. The electrical box of claim 1, wherein the single piece of continuous material is a steel piece.

16. An electrical box comprising:
a front including a substantially rectangular front base with a first edge, a second edge, a third edge, and a fourth edge, the first edge being substantially parallel to and opposite from the third edge, and the second edge being substantially parallel to and opposite from the fourth edge; and
four sides extending rearward from the front to define a substantially rectangular, backless enclosure for electrical connections, the four sides being formed from material folded rearward from at least two of the first edge, the second edge, the third edge, and the fourth edge;
the front and the four sides being parts of a single piece of continuous material; and
each of at least two of the sides having a distinct respective seam.

17. The electrical box of claim 16, further comprising:
a first covering tab folded backward from the front to cover a first opening in one of the first edge, the second edge, the third edge, and the fourth edge; and
a second covering tab folded backward from the front to cover a second opening in another of the first edge, the second edge, the third edge, and the fourth edge.

18. The electrical box of claim 17, further comprising:
a first mounting flange and a second mounting flange on opposite sides of the front from each other;
wherein the first covering tab is formed from a first cutout included in the first mounting flange and the second covering tab is formed from second cutout included in the second mounting flange.

19. The electrical box of claim 16, further comprising:
an integral mud ring that extends forward from the substantially rectangular front base.

20. The electrical box of claim 16, wherein the four sides include:
a first side adjacent to the first edge;
a second side adjacent to the second edge;
a third side adjacent to the third edge; and
a fourth side adjacent to the fourth edge;
wherein the first side, a first part of the second side, and a first part of the fourth side are formed from material folded rearward from the first edge; and
wherein the third side, a second part of the second side, and a second part of the fourth side are formed from material folded rearward from the third edge.

* * * * *